Figure 1:
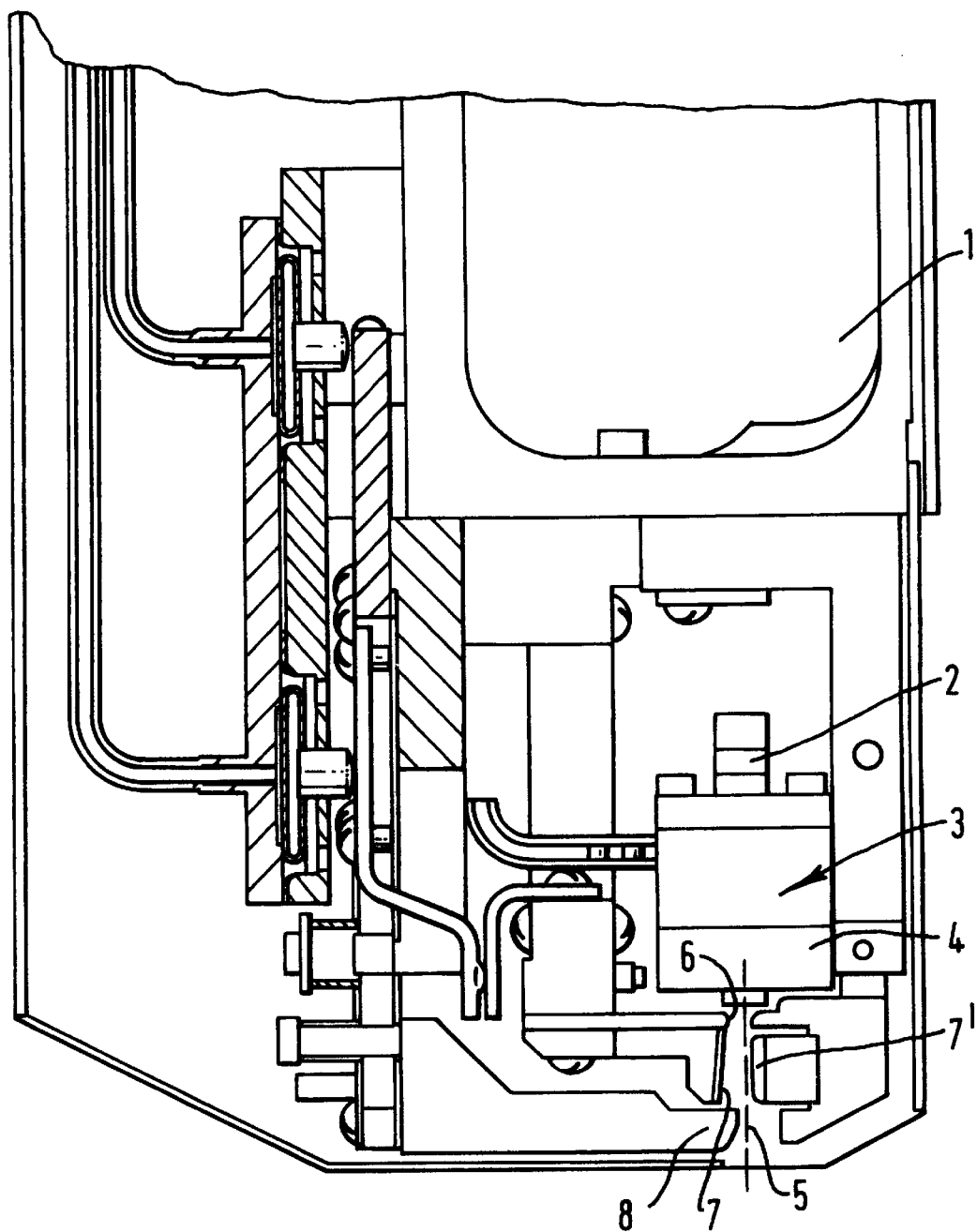

United States Patent [19]
Lecheheb et al.

[11] Patent Number: 6,106,600
[45] Date of Patent: Aug. 22, 2000

[54] INKS FOR CONTINUOUS INKJET PRINTING

[75] Inventors: Ammar Lecheheb, Cambridge; Kim Smith, Norwich; Barry John Few; Richard England, both of Cambridge, all of United Kingdom

[73] Assignee: Domino Printing Sciences Plc, United Kingdom

[21] Appl. No.: 09/143,692

[22] Filed: Aug. 28, 1998

[30] Foreign Application Priority Data

Sep. 2, 1997 [GB] United Kingdom .................... 9718619

[51] Int. Cl.$^7$ ........................................ C09D 11/00
[52] U.S. Cl. ..................... 106/31.37; 106/31.69; 106/31.86; 106/31.58
[58] Field of Search .............. 106/31.37, 31.69, 106/31.58, 31.86

[56] References Cited

U.S. PATENT DOCUMENTS 3,776,742  12/1973  Sanders ................................ 106/31.37
4,680,058   7/1987  Shimizu et al. .

FOREIGN PATENT DOCUMENTS

3415098A1  of 0000  Germany .

*Primary Examiner*—Mark L. Bell
*Assistant Examiner*—Veronica F. Faison
*Attorney, Agent, or Firm*—Robert F. I. Conte; Lee, Mann, Smith, McWilliams, Sweeney & Ohlson

[57] ABSTRACT

An ink jet ink is disclosed which comprises a binder, a colorant, a conductivity controller and a liquid vehicle in which at least the binder and colourant are soluble, the binder being a nitrocellulose having a viscosity of 15 centipoise or less as measured by method 1 herein; or a weight average molecular weight of not more than 25,000 as measured by method 3 herein; or the nitrocellulose has both the said viscosity and the said weight average molecular weight;

and in that the nitrocellulose has a nitrogen content of at least 9.5% by weight as measured by the method of ASTM D 301-72;

and in that the ink has a viscosity of 1.6 to 4 centipoise at 25° C. using a Brookfield DV-11+ viscometer with a number 00 spindle at 60 r.p.m (method 2 herein).

21 Claims, 1 Drawing Sheet

INKS FOR CONTINUOUS INKJET PRINTING

The present invention relates to inks for ink jet printers and especially those which are known as continuous inkjet (CJD) printers. It will be described with reference to such printers but it will be appreciated that the inks described herein may also find uses in a far wider range of less demanding applications, such as drop on demand.

An ink jet printer projects from a printer head a stream of ink droplets to impact on the substrate to be marked as the substrate is conveyed, typically at high speed, past the head. The droplets are controlled, typically electrically, so that they are deposited in a controlled array and the substrate is thereby printed with a desired indicia. Typically such indicia are code numbers and letters, dates such as "sell by" dates and other alphanumeric data. Precision is clearly essential as well as high speed.

In addition whilst the jet will be continuously operating during a printing run, the ink must also be stable physically and chemically during periods between runs.

Ink which is not deposited on the substrate is collected automatically and recycled to a return tank. To enable the ink to be applied in this way it has to have a viscosity held to close limits. In addition in order for the ink to dry or set on the substrate it is necessary for components of the ink to evaporate off from the image on the substrate. Accordingly to maintain sufficient fluidity a make up fluid has to be added to the return tank to replace lost fluids.

This invention relates specifically to an ink for use in a multi nozzle ink jet print head.

Continuous ink jet printing, to which the present invention relates requires a continuous stream of ink which is broken up into droplets which are then selectively charged; either charged or non-charged droplets are allowed to pass to a substrate for printing, charged droplets being deflected in an electric field either on to the substrate or into a gutter (according to design) where the non-printed droplets are collected for re-use. In the first case, the droplets are deflected by an electric field onto the substrate with the uncharged drops going straight on to be collected in a gutter for re-use. The amount of charge also determines the relative printed position of the drops. In the second case, the droplets are deflected into an offset gutter, with the printing drops being the uncharged ones going straight onto the substrate. The obvious advantage of printing with the uncharged drop is that, in a multijet printer where several drop generators are aligned perpendicular to a moving substrate, the alignment of the drops printed on the substrate is not dependent on the ability to accurately and uniformly charge the drops. As long as the charge on the droplets is sufficient for the drops to be deflected into the gutter aperture, small variations in the charge applied will not affect the quality of the resulting print. This second type of printer is generally known as a binary jet printer as the droplets are either charged or uncharged (and do not intentionally carry varying amounts of charge that determine print position).

The present invention is concerned with a problem which arises with such binary jet printers.

In typical continuous ink jet printers the print head has a droplet generator which creates a stream of droplets of ink by applying a pressure modulation waveform to the ink in a cavity in the print head and the continuous ink stream leaving the print head breaks up into individual droplets accordingly. This modulation waveform is usually a sinusoidal electrical signal of fixed wavelength. The stream of ink leaving the print head breaks up into individual drops at a distance (or time) from the print head commonly known as the break-up point, that is dependent on a number of parameters such as ink viscosity, velocity and temperature. Provided these and other factors are kept relatively constant, then a given modulation waveform will produce a consistent break-up length. In order to induce a charge on the droplet, the charging waveform must be applied to the stream at the moment before the drop separates from the stream, and held until the drop is free (i.e. must straddle the break-up point). It is therefore necessary to know the phase relationship between the modulating waveform and the actual drop separating from the stream (i.e. during which part of the sinusoidal modulation waveform does break-up occur). The charging waveform is applied by a charging electrode or electrodes.

One method of determining this phase relationship involves a charge detector (and associated electronics), positioned somewhere after the charging electrode, which can detect drops have been successfully charged.

Knowledge of the precise methodology of the charging of the drops is not necessary to an understanding of the present invention and thus will not be further described.

The problem which occurs is that the ink or components thereof build up on the charging electrodes and also on the charge detector. This interferes with the operation of the printer and after a shorter or longer time requires printing to stop and the machine to be serviced to remove the build up.

Up to the present time run times are not reliably longer than 8 hours. It would be very desirable to be able to run the printers for longer intervals between servicing whilst still obtaining an adequate print. Binary jet printers are typically used to apply large amounts of information to paper rapidly such as addresses, company logos and bar codes e.g. when despatching large numbers of items as in mail shots.

Our experience with other ink jet printers has lead us to expect that using higher solution viscosity and thus molecular weight nitrocellulose would solve the problem. We tried this but instead of improving the run time it was drastically reduced down to minutes or seconds and got worse as the solution viscosity and thus molecular weight increased.

We then tried electronic procedures, such as reversing the polarity of the electrodes but this was also unsuccessful.

Contrary to our initial expectations we then tried using nitrocellulose of lower solution viscosity and thus molecular weight. To our surprise this produced a radical improvement in run time.

A search by the British Patent Office cited only two documents both only as indicating technological background. These were U.S. Pat. No. 4,680,058 (Hitachi) and DE 3415098 (Staedtler). Neither disclosed the problem with which the present invention is concerned nor the use of nitrocellulose of lower solution viscosity as a way of overcoming the problem. The inks disclosed include nitrocellulose as part of the ink binder but do not disclose the choice of a nitrocellulose of low solution viscosity.

According to the present invention an ink jet ink comprises a binder, a colourant, a conductivity controller and a liquid vehicle in which at least the binder and colourant are soluble characterised in that the binder is a nitrocellulose having a viscosity of 15 centipoise or less when measured at 25° C. by a falling ball viscometer method in accordance with ASTM D 301-72 and D 1343-74 in which 12.2% by weight of nitrocellulose dried with compressed air at 30 lbs/sq. in. and at 60° C. for 30 minutes is dissolved in a solvent consisting of a mixture of 25% by weight of ethanol (190 proof, 92.5% by weight), 20% by weight ethyl acetate (85–88% grade conforming to ASTM D 302-75, specific gravity 0.883 to 0.888 at 20/20° C.) and 55% by weight toluene (industrial pure, conforming to ASTM D 362-75, specific gravity 0.860 to 0.870 at 20/20° C.) in a wide mouth 16 oz bottle having an internal diameter of 6.4 cms with a screw cap and 63 ml metal caps (supplied by Erno Products Company, Philadelphia, Pa. USA or equivalent), held in a bottle holder with cross bars defining a lengthwise spacing down the bottle of 2 in (5.08 cms) between the tops of the cross bars, and the bottle in the holder is located in a water-bath at 25° C. for 8 hrs and then the time taken for an aluminium ball 1/16 in (0.157–0.160 cms) diameter, (weight 0.059 to 0.060 g for 10 balls, density 2.815 to 2.825 g/ml, supplied by Hartford Ball Co., Rocky Hill, Conn. 06067, USA or equivalent) to fall the 2 inches through the solution between the cross bars when the ball is dropped into the center of the neck of the bottle is measured in seconds using a stopwatch reading to 0.2 second intervals and the time converted to centipoise by using the following equations 1 and 2 in which equation 1 is $$K=2\ gr^2[1-2.104(d/D)^3]/9L$$

where g=acceleration due to gravity in cgs units (which at sea level is 981)

L=distance of ball fall in centimeters (which is 5.08 cms) and

D=bottle diameter in centimeters (which is 6.4 cms)

r=ball radius in cms=0.0794 d=ball diameter in cms=0.1588 and equation 2 is n=viscosity $$n=K(a-B)t$$

where n=viscosity in poise at the specified temperature,

K=the apparatus constant obtained from equation 1 above, a=ball density in grams per milliliter, t=time of ball fall in seconds to the nearest 0.2 seconds, (method 1 hereafter);

or the nitrocellulose has a weight average molecular weight of not more than 25,000 as measured by gel permeation chromatography (GPC hereafter) at 25° C. using a VIS-COTEK model 250 machine having triple detectors namely refractive index detector, online viscometer detector, and light scattering detector, and using TriSEC software version 3, and a polystyrene standard of weight average molecular weight of 68,000 dissolved in methyl ethyl ketone (MEK hereafter) at a concentration of 1.5 milligrams polystyrene/ml of MEK, the nitrocellulose being dissolved in MEK at a concentration of 20 milligrams of nitrocellulose/ml of MEK (method 3 hereafter); or the nitrocellulose has both the said viscosity and the said weight average molecular weight; and in that the nitrocellulose has a nitrogen content of at least 9.5% by weight as measured by the method of ASTM b 301-72;

and in that the ink has a viscosity of 1.6 to 4 centipoise at 25° C. using a Brookfield DV-11+ viscometer with a number 00 spindle at 60 r.p.m (method 2 hereafter).

The binder has the function of carrying the colouring agent and adhering it to the substrate.

The nitrocellulose binder preferably has a viscosity of at least 5 preferably at least 6, 7, 8 or 9 centipoise up to 15 centipoise as measured by method 1, more preferably 10 to 15 and especially 11–14 centipoise.

The nitrocellulose has a nitrogen content of at least 9.5% by weight, e.g. 9.5 to 12.5% by weight, preferably 10.5 to 12.5% by weight, and particularly preferably 11.5 to 12.5% by weight.

The preferred binder is nitrocellulose with a relatively low molecular weight and a relatively high nitrogen content. Preferably the nitrocellulose has a nitrogen content of 11.5 to 12.5% by weight. Thus we have found that nitrocellulose grades having nitrogen contents of 11.5 to 12.5% by weight with viscosities in the range 10–15 centipoise measured by method 1 as described above give improved results, as compared to materials with the same nitrogen content but with higher viscosities and thus molecular weights, namely viscosities in the range 18 to 25 centipoise as measured by method 1.

The GPC weight average molecular weight is preferably in the range 5,000 to 25,000 more preferably 10,000 to 24,500 especially 12,000 to 23,000 e.g. 14,000 to 22,000 or 14,000 to 18,000.

We have found that a nitrocellulose having a viscosity of 10–15 centipoise as measured by method 1 above and a weight average molecular weight of 24,100 as measured by method 3 above gives improved results as compared to a nitrocellulose of the same nitrogen content but with a viscosity of 18 to 25 centipoise as measured by method 1 above and a weight average Molecular weight of 27,700.

We have tried other polymers such as polyacrylates of lower molecular weights but these have been unsuccessful, deposits forming within seconds.

With regard to the colourant this has usually been related to the liquid vehicle. The colourant may be soluble in organic solvents e.g. methyl ethyl ketone, or $C_{1-4}$ alcohols e.g. methanol or ethanol (for example as industrial methylated spirits) or they may be soluble in alcohols mixed with water, or soluble in both alcohols and water.

Thus, the colourant is preferably a dyestuff soluble in the liquid vehicle; however very finely divided pigments could be contemplated.

Examples of colourants which have been advocated for use in ink jet inks are dyestuffs soluble in alcohol alone such as Basic Blue 81, Solvent Orange 7 and Solvent Blue 58. Examples which are soluble in alcohol and water are Basic Violet 10, Acid Red 52, Acid Black 1, Acid Blue 59, Acid Red 73 and Acid Blue 9.

Triarylmethane dyes have also been advocated. Examples of these are Crystal Violet Fn (available from BASF) and Victoria Blue B base (available from Hilton Davis).

Other dyes include Orasol RL1 (Ciba-Geigy), Valifast 3808 and 3310 (Orient Chemicals), Duasyn Blak ARG (Hoechst) and Projet MEK (Zeneca).

The colourants are employed in amounts appropriate to give the desired colour intensity in the deposit.

The colourant is preferably a dyestuff soluble in both MEK and alcohols.

The liquid vehicle has to be such as to impart the desired fluidity (or low viscosity) to the ink but must evaporate at a high enough rate to leave the deposited image resistant to smudging soon after it is deposited. It must also be good enough solvent to get the colourant and polymer intimately admixed.

Methyl ethyl ketone (MEK) has been used very effectively in commercially available ink jet formulations, as has ethyl acetate. However, these are thought to have adverse effects on the environment. It is thus desired to replace then with other liquid vehicles. Alcohols and mixtures of alcohols and water have been advocated.

However MEK systems give good adhesion to many substrates and MEK evaporates rapidly giving a short smudge time—typically the deposit becomes dry and smudge free within 2 seconds.

The liquid vehicle is preferably predominantly an aliphatic or an alicyclic ketone, methyl ethyl ketone being very much preferred, or a $C_1$–$C_4$ alkanol. The liquid vehicle may also contain a $C_{1-4}$ alkanol e.g. industrial methylated spirits which is 95% ethanol plus methanol and water, or isopropanol. It may also contain other solvents and solubility assistants to help promote solubilisation of the binder, colourant and conductivity controller, such as isopropyl acetate or other $C_{1-4}$ esters of $C_1$–$C_4$ alcohols.

Preferably the liquid vehicle is predominantly an aliphatic or an alicyclic ketone, together with a $C_1$–$C_4$ alkanol or a $C_1$–$C_4$ ester of a $C_1$–$C_4$ alkanol or a mixture of ketone, alkanol and ester.

The inks are formulated to have viscosities appropriate for the expected uses which need to include use at temperatures as low as 5° C. where the viscosity will increase. The viscosity of the ink is preferably in the range 2.5–3.5 centipoise as measured by method 2 described above.

The conductivity controller function is preferably provided by the colourant or species associated with or accompanying the colourant and is preferably soluble in the liquid vehicle.

Alternatively a separate, preferably soluble, conductivity controller may be used.

The conductivity controller function is to make the ink of sufficient conductivity to enable it to be ink jet printed. The function may be provided by an ionisable compound e.g. an inorganic salt such as potassium thiocyanate or lithium nitrate. An example of an organic ionisable salt is tetrabutyl ammonium bromide.

Typically the conductivity controller is present in an amount based on the ink by weight in the range 0.1% to 5% e.g. 0.5 to 3.0%, especially 0.75 to 2.0%.

The formulations preferably contain 55–80 e.g. 60–70% ketone e.g. methyl ethyl ketone; 5–15%, e.g. 9–14% of a $C_1$–$C_4$ alcohol e.g. ethanol, IMS, isopropyl alcohol or a mixture thereof e.g. 5–10%, e.g. 6–9% of IMS and 3–10%, e.g. 4–8% of isopropyl alcohol; and 5–10%, e.g. 6–9% of $C_1$–$C_4$ esters of $C_1$–$C_4$ alcohols e.g. isopropylacetate, as the liquid vehicle.

The formulations preferably contain 2%–14% of the binder, more preferably 2–10%, e.g. 3–9.5% by weight.

The colourant is usually present in an amount of 0.1%–15%, e.g. 0.5%–10% especially 4%–7% by weight. All these proportions are based on the total weight of the ink.

In a preferred form of the invention an ink jet ink comprises: as binder 3 to 9.5% by weight of a nitrocellulose having a nitrogen content of 11.5 to 12.5%, and a viscosity of 10–15 centipoise as measured by method 1; or a weight average molecular weight of 14,000 to 24,000 as measured by method 3; or both the said viscosity and the said molecular weight; 0.5 to 10% by weight of colourant and conductivity controller combined; as liquid vehicle 60–70% of methyl ethyl ketone, 9–14% of a $C_1$–$C_4$ alkanol and 6–9.5% of a $C_1$–$C_4$ alkanol; the ink having a viscosity of 2.5 to 3.5 centipoise as measured by method 2.

In general, the ink compositions of the present invention exhibit the following characteristics for use in ink jet applications: a viscosity from about 1.6 to 4.0, preferably 2.5 to 3.5 centipoise at 25° C. as measured by method 2 described above; a surface tension of 23 to 31 dynes; and a conductivity of at least 700 e.g. 700 to 2000 or 3000 or higher microSeimens/cm (µs/cm).

The invention may be put into practice in various ways and a number of specific embodiments will be described to illustrate the invention with reference to the accompanying examples, and the accompanying drawing which illustrates the structure of the ink jet printer in which the problem with which the present invention is concerned occurs;

FIG. 1 is a side view of the print head of a multi nozzle binary CIJ printer.

Since not all the features shown in FIG. 1 are relevant for a description of the present invention only the primary features will be referenced and described.

The print head has an electronics sub-system 1 by means of which are controlled the piezoelectric oscillator 2 forming part of a droplet generator 3 which has a nozzle plate 4 from which, in use, issue plural streams 5 of ink. The closely spaced nozzles are arranged in a row normal to the plane of the drawing. The streams of ink break up into individual droplets which pass respective charge electrodes 6 also arranged in a row in the same direction, where they are selectively charged and then passed between a pair of deflection electrodes 7, 7' which establish, in use, an electric field by means of which charged droplets are deflected from their straight-line path into a gutter 8. Formed in the face of the deflection electrode 7' is a phase detector electrode (not shown) which is used to detect the charge applied to droplets by the charge electrode 6, (the precise details of which are not necessary to understanding of the present invention).

The modulation waveform applied to the piezoelectric oscillator 2 and used to generate a corresponding pressure modulation within the droplet generator 3 so that the streams 5 of ink break up into droplets, is a sinusoidal electrical signal, (the precise details of which are not necessary to understanding of the present invention). The amplitude of the modulation voltage is controlled from the electronics module 1 and can be set by appropriate software. As long as the ink parameters (composition, viscosity, temperature) are kept constant then a defined modulation waveform will produce a consistent drop break off pattern from each nozzle. This means that the time between the zero-point on the waveform and the time when the drop breaks away from the stream will be constant (i.e. there is a constant phase relationship between the modulation waveform and the break up point of the ink stream). This fact can be used to set a fixed relationship between the charge waveform applied to the charge electrode 6 and the droplet break up rate. The charge electrode waveform and the modulation waveform are derived from a common system clock within the electronics module 1.

For the purposes of printing, the charge controller waveform (the precise details of which are not necessary to understanding of the present invention) is a digital or square waveform which has a value of 0 volts for droplets which are to be printed and a steady high voltage (in the region of 60–180 volts) for non-printable droplets. The transition between the two voltage values is very rapid (of the order of 0.5 microseconds). The phase of the charge controller waveform determines when the transition occurs between the two voltages.

Droplet charging arises from the fact that there is a small capacitance between the droplet being formed and the charge electrode. A voltage on the charge electrode thus causes a small displacement current to flow in the ink jet which forms a collection of charge on the droplet so that once the droplet has broken away from the stream it carries a charge which cannot change. A steady voltage on the charge electrode produces a continuous stream of charged droplets. In a similar way, 0 volts on the charge electrode 6 does not induce any charge on the droplet. Furthermore, an uncharged droplet cannot acquire any charge once it breaks off the stream so that a steady 0 volts on the charge electrode 6 will produce a stream of uncharged droplets.

During printing the charge electrode voltage has to be switched between 0 volts and the high voltage for a single drop period in order to allow a droplet to be printed. In order to produce a drop with no charge the charge electrode 6 has to be held at 0 volts while the drop breaks off and, ideally, the charge electrode 6 is kept at 0 volts for as long as possible on each side of the break off point. In practice, however, there is a limit to the time for which the charge electrode voltage can be held constant without interfering with the charge on the previous drop or that on the following drop and the optimum point for changing the charge electrode voltage is halfway between the break-off points of adjacent droplets.

In the printer of this example, in which the ink of the present invention is used, there are 128 nozzles (and a corresponding number of charge electrodes 6) which are, effectively, divided into 8 groups of 16. A single charge electrode controller is used to apply the appropriate charging waveform to each of the 16 charge electrodes in a group and thus 8 of these are provided.

The problem which is met with in using prior art inks is that components of the ink build up on the charge electrodes 6 and on the phase detector and result in imperfections in the printing. The problem is discussed in EP-A-0709198 (Scitex) which describes the problem as first build up of deposits and then "spitting" of ink droplets. Scitex attempt to solve the problem by electronic means, namely providing for reversal of the polarity of the charging means.

Scitex give formulations for the inks they use but do not identify the chemical composition of the resin polymers which they use as binders in their linear binary ink jet printer. Their compositions contained large amounts of water 82.5 to 91.65% and small amounts of resin polymer 0.67 to 2.70% by weight.

The present applicants have found that printers such as described in FIG. 1 herein can be used for up to 8 hours before needing servicing when conventional inks containing nitrocellulose of viscosity 18 to 25 centipoise (as measured by method 1 above) as the binder are used.

When the formulations of the present invention are used substantial increases in run time before servicing is needed are unexpectedly achieved.

EXAMPLES 1 AND 2

An ink jet ink composition was made up with the ingredients shown in Table 1 below.

The binder is charge into the mixing vessel followed by the liquid vehicle. The mixture is stirred vigorously until the binder is completely dissolved. Other additives are then added followed by a colourant. The ink is left stirring for a further 24 hours then filtered through a 1 micron filter. All amounts are % by weight.

The inks were then run in the printer described above. The run sequence was continuous running until problems occurred.

TABLE 1

| Example | 1 | 2 |
|---|---|---|
| Ingredient | | |
| Binder | | |
| Nitrocellulose | 10.0 (8) | 9.1 (9) |
| Liquid vehicle | | |
| MEK (1) | 63.0 | 64.6 |
| IMS (2) | 8.0 | 7.3 |
| IPA (3) | 3.0 | 3.8 |
| IPAC (4) | 9.0 | 9.1 |

TABLE 1-continued

| Example | 1 | 2 |
|---|---|---|
| Colourant | | |
| Valifast 3808 (5) | 6.0 | 6.1 |
| Total | 100.0 | 100.0 |
| Properties | | |
| Ink viscosity (6) | 4 | 2.5 ± 0.3 |
| Run time (7) | 8 hrs | 50 hrs |

Notes on Table 1
(1) MEK is a methyl ethyl ketone
(2) IMS is industrial methylated spirits (which is 95% ethanol balance methanol and water)
(3) IPA is isopropyl alcohol
(4) IPAC is isopropyl acetate
(5) Valifast 3808 is supplied by Orient Chemicals as 100% actives powder. This dye provides a charged species and a counterion and affords necessary conductivity to the ink obviating the need for a separate conductivity controller
(6) Ink viscosity is quoted in centipoise and is measure at 25° C. using the method 2 described above
(7) Run time is the time for continuous running before deposits occur such as to cause incorrect printing.
(8) The binder was RS20 supplied by Hercules Company which has a nitrogen content of 11.5 to 12.5% by weight and a viscosity of 18–25 centipoise measured by method 1 as described above. RS20 has a weight average molecular weight of 27,700 (average of 3 runs 27,600, 28,000, 27,600) as measured by method 3 above; the weight average molecular weight of the nitrocellulose measured on the ink formulation compared to the polystyrene standard in MEK was 26,200 (average of 3 runs 27,700, 25,400, 25,600) as measured by method 3 above.
(9) The binder is nitrocellulose RS10 supplied by Hercules Company which has a nitrogen content of 11.5 to 12.5% by weight and a viscosity of 10–15 centipoise as measured by method 1 as described above. RS10 has a weight average molecular weight of 24,100 (average of 3 runs 24,300, 24,100, 24,000) as measured by method 3 above; the weight average molecular weight of the nitrocellulose measured on the ink formulation compared to the polystyrene standard in MEK was 21,800 (average of 3 runs 21,400, 22,200, 21,800) as measured by method 3 above.
As can be seen from a comparison of the examples when an ink of suitable low viscosity is made up (4 centipoise or less) with a nitrocellulose of suitable low viscosity (15 or less centipoise) or a suitably low GPC weight average molecular weight (25,000 or less namely 24,100) then very remarkable improvements in run time are achieved from 8 hours in Example 1 to 45 or 50 hours in Example 2.

What is claimed is:

1. An ink jet ink comprising a binder, a colourant, a conductivity controller and a liquid vehicle in which at least the binder and colourant are soluble, in which the binder consists of a nitrocellulose having a viscosity of 15 centipoise or less; or a weight average molecular weight of not more than 25,000;

and the nitrocellulose has a nitrogen content of at least 9.5% by weight as measured by the method of ASTM D 301-72;

and in that the ink has a viscosity of 1.6 to 4 centipoise at 25° C. using a Brookfield DV-11+ viscometer with a number 00 spindle at 60 r.p.m.

2. An ink as claimed in claim 1 in which the nitrocellulose binder has a viscosity of at least 5 up to 15 centipoise wherein the viscosity is measured at 25° C. by a falling ball viscometer method in accordance with ASTM D 301-72 and D 1343-74 in which 12.2% by weight of nitrocellulose that was dried with compressed air at 30 lbs/sq. in. and at 60° C. for 30 minutes is dissolved in a solvent consisting of a mixture of 25% by weight of ethanol (190 proof. 92.5% by weight), 20% by weight ethyl acetate (85–88% grade conforming to ASTM D 302-75, specific gravity 0.883 to 0.888 at 20/20° C.) and 55% by weight toluene (industrial pure. conforming to ASTM D 362-75, specific gravity 0.860 to 0.870 at 20/20 ° C.) in a wide mouth 16 oz bottle having an internal diameter of 6.4 cm with a screw cap and 63 ml metal caps, held in a bottle holder with cross bars defining a lengthwise spacing down the bottle of 2 in (5.08 cm) between the tops of the cross bars, and the bottle in the holder is located in a water-bath at 25° C. for 8 hrs and then the time taken for an aluminum ball 1/6 in (0.157–0.160 cm) diameter, (weight 0.059 to 0.06 g for 10 balls, density 2.815 to 2.825 g/ml, ) to fall the 2 inches through the solution between the cross bars when the ball is dropped into the center of the neck of the bottle is measured in seconds using a stopwatch reading to 0.2 second intervals and the time converted to centipoise by using the following equations 1 and 2 in which equation 1 is $$K = 2\ gr^2\ [1 - 2.104(d/D)^3]/9L$$

where g=acceleration due to gravity in cgs units (which at sea level is 981)

L=distance of ball fall in centimeters (which is 5.08 cm) and

D=bottle diameter in centimeters (which is 6.4 cm)

r=ball radius in cm=0.0794 d=ball diameter in cm=0.1588 and equation 2 is $$n = K(a - B)t$$

where n=viscosity in poise at the specified temperature,

K=the apparatus constant obtained from equation 1 above, a=ball density in grams per milliliter, t=time of ball fall in seconds to the nearest 0.2 seconds.

3. An ink as claimed in claim 2 in which the nitrocellulose binder has a viscosity of 10–15 centipoise.

4. An ink as claimed in claim 2 in which the nitrocellulose has a viscosity in the range 11–14 centipoise.

5. An ink as claimed in claim 1 in which the nitrocellulose has a weight average molecular weight in the range 10,000 to 24,500 wherein the molecular weight is measured by gel permeation chromatography at 25° C. using a VISCOTEK model 250 machine having triple detectors namely refractive index detector, online viscometer detector, and light scattering detector, and using TriSEC software version 3, and a polystyrene standard of weight average molecular weight of 68,000 dissolved in methyl ethyl ketone at a concentration of 1.5 milligrams polystyrene/ml of methyl ethyl ketone, the nitrocellulose being dissolved in methyl ethyl ketone at a concentration of 20 milligrams of nitrocellulose/ml of methyl ethyl ketone;

and the nitrocellulose has a nitrogen content of at least 9.5% by weight as measured by the method of ASTM D 301-72;

and in which the ink has a viscosity of 1.6 to 4 centipoise at 25° C. using a Brookfield DV-11+ viscometer with a number 00 spindle at 60 r.p.m.

6. An ink as claimed in claim 5 in which the nitrocellulose has a weight average molecular weight in the range 14,000 to 24,500.

7. An ink as claimed in claim 1 in which the nitrocellulose has a nitrogen content of 11.5 to 12.5% by weight.

8. An ink as claimed in claim 1 in which the liquid vehicle is predominantly an aliphatic or an alicycle ketone or a C1–C4 alkanol.

9. An ink as claimed in claim 1 in which the liquid vehicle is predominantly an aliphatic or an alicyclic ketone, together with a C1–C4 alkanol or a C1–C4 ester of a C1–C4 alkanol or a mixture of ketone, alkanol and ester.

10. An ink as claimed in claim 1 which has a viscosity in the range 2.5–3.5 centipoise.

11. An ink as claimed in claim 1 in which the conductivity controller function is provided by the colourant or species associated with or accompanying the colourant and is soluble in the liquid vehicle.

12. An ink as claimed in claim 1 which contains 55–80% of a ketone; 5–15% of a C1–C4 alcohol; and 5–10% of a C1–C4 ester of a C1–C4 alcohol, as the liquid vehicle.

13. An ink as claimed in claim 1 which comprises 3 to 9.5% by weight of said nitrocellulose, said nitrocellulose having (a) a nitrogen content of 11.5 to 12.5%, and a viscosity of 10–15 centipoise; or (b) a nitrogen content of 11.5 to 12.5% and said weight average molecular weight of 14,000 to 24,500; or (c) a nitrogen content of 11.5 to 12.5% and a viscosity of 10–15 centipoise and said weight average molecular weight of 14.000 to 24.500: and 0.5 to 10% by weight of colourant and conductivity controller combined; and as a liquid vehicle 60–70% methyl ethyl ketone, 9–14% of a $C_1$ $C_4$ alkanol and 6–9.5% of a $C_1$–$C_4$ ester of a $C_1$–$C_4$ alkanol; and the ink having a viscosity of 2.5 to 3.5 centipoise.

14. A method of printing with a binary ink jet printer comprising feeding to said printer an ink as claimed in claim 1.

15. The method of printing with a binary ink jet printer comprising feeding to said printer an ink as claimed in claim 13.

16. A method of preparing a binary ink jet printer ink comprising preparing said ink with a binder consisting of a nitrocellulose having a viscosity of 15 centipoise or less; or a weight average molecular weight of not more than 25,000; or both the said viscosity and the said molecular weight; and in that the nitrocellulose has a nitrogen content of at least 9.5% by weight as measured by the method of ASTM D 301-72; and said ink having a viscosity of 1.6 to 4 centipoise at 25° C. whereby build-up of deposits on the printer head are lessened.

17. The method of claim 16 wherein the nitrocellulose has a viscosity of at least 5 up to 15 centipoise.

18. The method of claim 17 wherein the nitrocellulose has a viscosity in the range 11–14 centipoise.

19. The method of claim 16 comprising a liquid vehicle and said liquid vehicle being predominantly an aliphatic or an alicyclic ketone, together with $C_1C_4$ alkanol or a $C_1C_4$ ester of a $C_1C_4$ alkanol or a mixture of ketone, alkanol and ester.

20. The method of claim 16 wherein the ink comprises as a binder 3 to 9.5% by weight of said nitrocellulose having a nitrogen content of 11.5 to 12.5%, and a viscosity of 10–15 centipoise; or a weight average molecular weight of 14,000 to 24,500; or both the said viscosity and the said molecular weight; 0.5 to 10% by weight of colorant and conductivity controller combined;

a liquid vehicle of 60–70% methyl ethyl ketone, 9–14% of a $C_1C_4$ alkanol and 6–9.5% of a $C_1C_4$ ester of a $C_1C_4$ alkanol, and the ink having a viscosity of 2.5 to 3.5 centipoise.

21. An ink jet ink comprising a binder, a colourant, a conductivity controller and a liquid vehicle in which at least the binder and colourant are soluble, in which the binder consists of a nitrocellulose having a viscosity of at least 5 up to 15 centipoise wherein the viscosity is measured at 25° C. by a falling ball viscometer method in accordance with ASTM D 301-72 and D 1343-74 in which 12.2% by weight of nitrocellulose dried with compressed air at 30 lbs/sq. in. and at 60° C. for 30 minutes is dissolved in a solvent consisting of a mixture of 25% by weight of ethanol (190 proof, 92.5% by weight), 20% by weight ethyl acetate (85–88% grade conforming to ASTM D 302-75, specific gravity 0.883 to 0.888 at 20/20° C.) and 55% by weight toluene (industrial pure, conforming to ASTM D 362-75, specific gravity 0.860 to 0.870 at 20/20° C.) in a wide mouth 16 oz bottle having an internal diameter of 6.4 cm with a screw cap and 63 ml metal caps, held in a bottle holder with cross bars defining a lengthwise spacing down the bottle of 2 in (5.08 cm) between the tops of the cross bars, and the bottle in the holder is located in a water-bath at 25° C. for 8 hrs and then the time taken for an aluminum ball 1/6 in (0.157–0.160 cm) diameter, (weight 0.059 to 0.06 g for 10 balls, density 2.815 to 2.825 g/ml, ) to fall the 2 inches through the solution between the cross bars when the ball is dropped into the center of the neck of the bottle is measured in seconds using a stopwatch reading to 0.2 second intervals and the time converted to centipoise by using the following equations 1 and 2 in which equation 1 is $$K=2\ gr^2\ [1-2.104(d/D)^3]/9L$$

where g=acceleration due to gravity in cgs units (which at sea level is 981)

L=distance of ball fall in centimeters (which is 5.08 cm) and

D=bottle diameter in centimeters (which is 6.4 cm)

r=ball radius in cm=0.0794 d=ball diameter in cm=0.1588 and equation 2 is $$n=K(a-B)t$$

where n=viscosity in poise at the specified temperature,

K=the apparatus constant obtained from equation 1 above, a=ball density in grams per milliliter, t=time of ball fall in seconds to the nearest 0.2 seconds;

and in which the nitrocellulose has a weight average molecular weight in the range 10,000 to 24,500 wherein the molecular weight is measured by gel permeation chromatography at 25° C. using a VISCOTEK model 250 machine having triple detectors namely refractive index detector, online viscometer detector, and light scattering detector, and using TriSEC software version 3, and a polystyrene standard of weight average molecular weight of 68,000 dissolved in methyl ethyl ketone at a concentration of 1.5 milligrams polystyrene/ml of methyl ethyl ketone, the nitrocellulose being dissolved in methyl ethyl ketone at a concentration of 20 milligrams of nitrocellulose\ml of methyl ethyl ketone; and the nitrocellulose has a nitrogen content of at least 9.5% by weight as measured by the method of ASTM D 301–72;

and in which the ink has a viscosity of 1.6 to 4 centipoise at 25° C. using a Brookfield DV-11+ viscometer with a number 00 spindle at 60 r.p.m.

* * * * *